(12) United States Patent
Hoffmann et al.

(10) Patent No.: US 11,297,689 B2
(45) Date of Patent: Apr. 5, 2022

(54) SYSTEMS AND METHODS FOR UPLINK NOISE SUPPRESSION FOR A DISTRIBUTED ANTENNA SYSTEM

(71) Applicant: Andrew Wireless Systems GmbH, Buchdorf (DE)

(72) Inventors: Jaroslav Hoffmann, Donauwörth (DE); Klaus Peter Möller, Tapfheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 85 days.

(21) Appl. No.: 16/869,795

(22) Filed: May 8, 2020

(65) Prior Publication Data
US 2020/0374981 A1 Nov. 26, 2020

Related U.S. Application Data

(60) Provisional application No. 62/850,465, filed on May 20, 2019.

(51) Int. Cl.
| | |
|---|---|
| *H04W 88/08* | (2009.01) |
| *H04B 1/10* | (2006.01) |
| *H04B 7/022* | (2017.01) |
| *H04B 10/2575* | (2013.01) |
| *H04W 24/02* | (2009.01) |

(52) U.S. Cl.
CPC ........ *H04W 88/085* (2013.01); *H04B 1/1027* (2013.01); *H04B 7/022* (2013.01); *H04B 10/25753* (2013.01); *H04W 24/02* (2013.01)

(58) Field of Classification Search
CPC .. H04W 88/085; H04W 24/02; H04B 1/1027; H04B 7/022; H04B 10/25753
USPC ......................................... 370/310, 328, 329
See application file for complete search history.

(56) References Cited

U.S. PATENT DOCUMENTS

| | | |
|---|---|---|
| 7,035,671 B2 | 4/2006 | Solum |
| 7,512,419 B2 | 3/2009 | Solum |
| 2008/0198955 A1 | 8/2008 | Oren et al. |

(Continued)

OTHER PUBLICATIONS

International Searching Authority, "International Search Report and Written Opinion from PCT Application No. PCT/EP2020/063391", from Foreign Counterpart to U.S. Appl. No. 16/869,795, filed Jul. 29, 2020, pp. 1 through 15, Published: WO.

*Primary Examiner* — Obaidul Huq

(74) *Attorney, Agent, or Firm* — Fogg & Powers LLC

(57) ABSTRACT

In one embodiment a system comprises a master unit configured to receive a base station downlink radio frequency signal and transmit a base station uplink radio frequency signal; and a plurality of remote antenna units each communicatively coupled to the master unit using at least one cable, the remote antenna units each configured to radiate a remote downlink radio frequency signal from at least one antenna and to receive a remote uplink radio frequency signal from the at least one antenna. The master unit comprises a channel selective uplink muting circuit. The master unit receives and monitors uplink transport signals from the remote uplink radio frequency signal to identify one or more channels within the uplink transport signals that are not carrying uplink communications traffic; wherein the channel selective uplink muting circuit selectively mutes channels of the uplink transport signals that are not carrying uplink communications traffic.

18 Claims, 7 Drawing Sheets

(56) References Cited

U.S. PATENT DOCUMENTS

| | | | |
|---|---|---|---|
| 2014/0146906 A1* | 5/2014 | Zavadsky | H04B 7/022 375/267 |
| 2014/0314002 A1 | 10/2014 | Hanson et al. | |
| 2015/0237618 A1 | 8/2015 | Hanson et al. | |
| 2016/0285521 A1 | 9/2016 | Lange | |

* cited by examiner

SYSTEMS AND METHODS FOR UPLINK NOISE SUPPRESSION FOR A DISTRIBUTED ANTENNA SYSTEM

CROSS-REFERENCE TO RELATED APPLICATIONS

This is a U.S. Patent Application claiming priority to, and the benefit of, U.S. Provisional Patent Application No. 62/850,465, titled "SYSTEMS AND METHODS FOR UPLINK NOISE SUPPRESSION FOR A DISTRIBUTED ANTENNA SYSTEM" filed on May 20, 2019, which is incorporated herein by reference in its entirety.

BACKGROUND

A typical distributed antenna system (DAS) includes a master unit that is communicatively coupled with a plurality of remote antenna units. Each remote antenna unit can be coupled directly to one or more of the master units or indirectly via one or more other remote antenna units and/or via one or more intermediary or expansion units. A DAS is typically used to improve the coverage provided by one or more base stations that are coupled to the master unit. These base stations can be coupled to the master unit via one or more cables or via a wireless connection, for example, using one or more donor antennas. The wireless service provided by the base stations can include commercial cellular service and/or private or public safety wireless communications.

Typically, the amount of base station capacity deployed to provide public safety wireless services via a distributed antenna system may be relatively limited compared to the amount of base station capacity that is typically deployed to provide commercial cellular service via a distributed antenna system. However, the physical coverage area supported by the typical public safety distributed antenna system is typically rather large. For example, the coverage area of a public safety distributed antenna system may encompass a large metropolitan area. As such, such a public safety distributed antenna system will include many remote antenna units deployed in a manner to ensure adequate in-building coverage inside the buildings within that metropolitan area. However, when an emergency situation does occur, it typically will affect only a small area within the metropolitan area, such as a single building or campus. The communications of responders arriving to address the emergency situation can therefore be expected to only utilize a very small sub-set of the total number of remote antenna units of the public safety distributed antenna system.

In the uplink, each master unit of a distributed antenna system receives uplink transport signals that are transmitted from each of the remote antenna units used to expand the coverage area of a given base station. Typically, the master unit produces an uplink signal that is provided to the base station by combining or summing signals or data derived from the uplink transport signals received from the remote antenna units. One consequence of this is that each remote antenna unit used to expand the coverage area of a base station contributes uplink noise to the resulting uplink signal output by the master unit up to the base station. High levels of uplink noise can lead to desensitization of the receiver in the base station. For a distributed antenna system that includes many active remote antenna units, uplink noise in the resulting uplink provided to the base station may represent a substantial component of the overall uplink signal, reducing the sensitivity of the receiver in the base station to uplink signals transmitted by user equipment. While approaches have been suggested that focus on attenuating noise in the RF path of the remote antenna unit itself, such an approach does not sufficiently cover the uplink path to suppress other noise sources, such as noise generated by optical communication links. Moreover, a remote antenna unit focused approach requires costly investments in hardware and power at each remote antenna unit of the distributed antenna system, which would be multiplied by the number of remote antenna units in the distributed antenna system.

SUMMARY

Systems and methods for uplink noise suppression for a distributed antenna system are provided. In one example embodiments, a distributed antenna system comprises: a master unit configured to receive a base station downlink radio frequency signal and to transmit a base station uplink radio frequency signal; and a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna; wherein the master unit comprises a channel selective uplink muting circuit; wherein the master unit receives and monitors uplink transport signals from the remote uplink radio frequency signal to identify one or more channels within the uplink transport signals that are not carrying uplink communications traffic; and wherein the channel selective uplink muting circuit selectively mutes channels of the uplink transport signals that are not carrying uplink communications traffic.

DRAWINGS

In accordance with common practice, the various described features are not drawn to scale but are drawn to emphasize. Reference characters denote like elements throughout figures and text.

DETAILED DESCRIPTION

In the following detailed description, reference is made to the accompanying drawings that form a part hereof, and in which is shown by way of specific illustrative embodiments. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
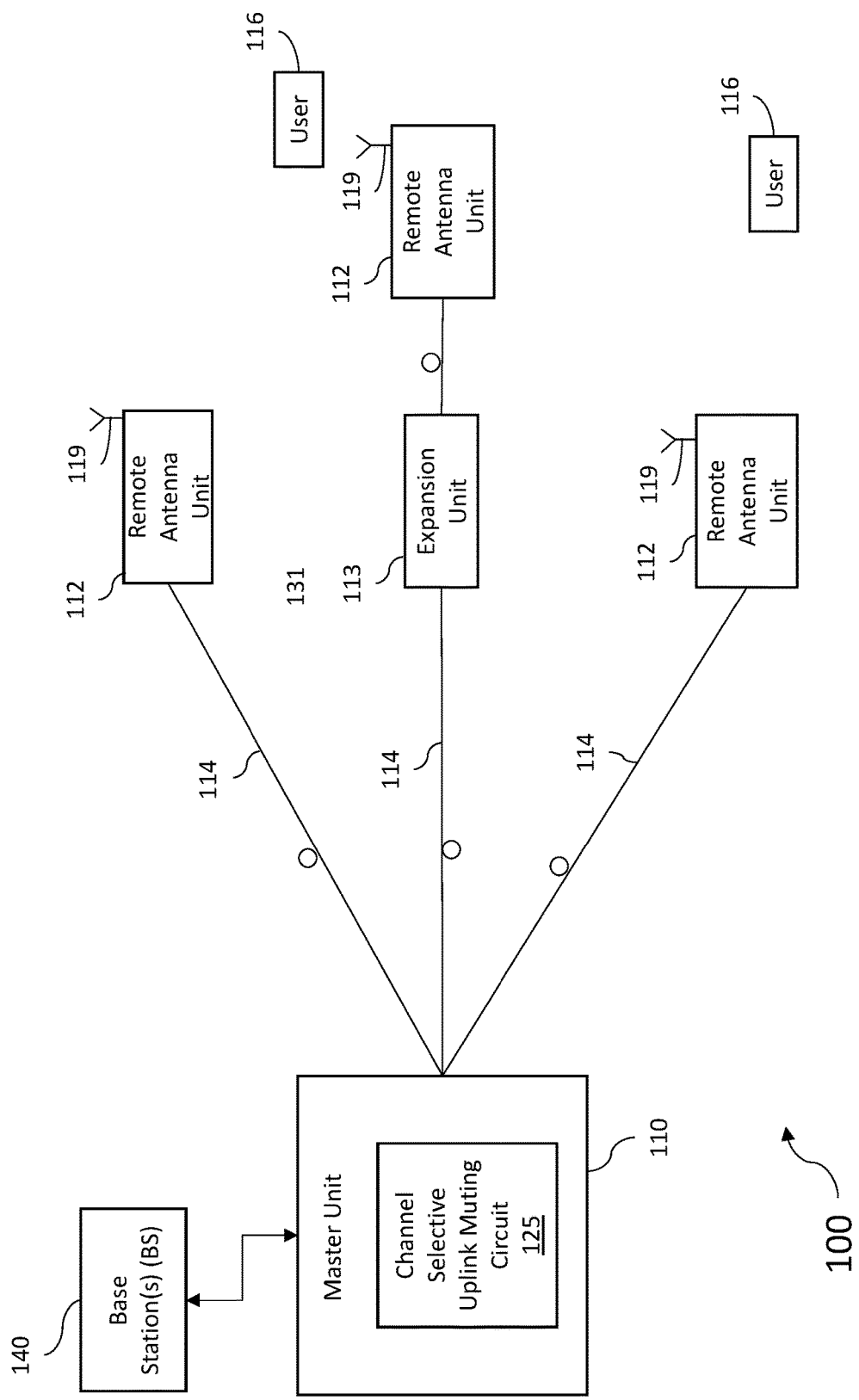
FIGS. 1, 1A, 1B and 1C are block diagrams illustrating an example distributed antenna system embodiment.

FIG. 1 is block diagram of one exemplary embodiment of a distributed antenna system (DAS) 100 that includes functionality in the master unit for channel selective uplink muting. The DAS 100 comprises a master unit 110 that is communicatively coupled to one or more remote antenna units 112 via one or more cables 114. Although the term "remote antenna unit" is used in this disclosure, those skilled in the art of distributed antenna systems would recognize "remote unit" as being an equivalent term for these elements of a DAS. Each remote antenna unit 112 can be communicatively coupled directly to the master unit 110 or indirectly via one or more other remote antenna units 112 and/or via one or more optional intermediary or expansion units 113. The master unit 110, remote antenna units 112, and expansion units 113 (if present) may be coupled together by cables 114 that comprise one or more optical fibers, as shown in FIG. 1, and therefore may be referred to as fiber optic cables 114. In such an embodiment, the master unit 110 may be referred to as an optical mater unit (OMU) 110, the remote antenna units 112 may be referred to as optical remote units (ORU) 112, and the expansion units 113 may be referred to as an optical expansion units (OEU) 113. In should be understood however that in some embodiments, one or more of the cables 114 may instead be implemented using electrically conductive cabling (for example, twisted-pair or coaxial cables).

As discussed in greater detail below, in the embodiment of FIG. 1, the master unit 110 includes channel selective uplink muting circuit 125 which functions to selectively attenuate uplink channels in the uplink path of the master unit 110 after the uplink signals carrying those channels have been converted from optical signals to electrical signals. In such a configuration, not only can uplink noise created in the remote antenna units be suppressed, the noise created by the electro-optical conversion process can also be suppressed to avoid or mitigate uplink receiver desensitization at the base station. As the term is used herein, a channel may refer to any scheme for multiplexing communications traffic stream, including time (e.g. timeslots), frequency (e.g. frequency bands) or other technologies, or combinations thereof. As such, for an uplink signal carrying multiple channels of uplink communications traffic, selective uplink muting encompasses the muting of specifically selected signals while allowing the uplink channels in that signal that are not selected for muting to pass through to the base station.

As shown in FIG. 1, master unit 110 is communicatively coupled to at least one base station 140. Base station 140 can be co-located with the master unit 110 to which it is coupled. Alternatively, a base station 140 can be located remotely from the master unit 110 to which it is coupled (for example, where the base station 140 provides base station capacity to an area beyond the coverage area of the DAS 100). In this latter case, the master unit 110 can be coupled to a donor antenna and repeater or bi-directional amplifier in order to wirelessly communicate with the remotely located base station 140. In this exemplary embodiment, the base station 140 may comprise a base stations that is used to provide public and/or private safety wireless services (for example, wireless communications used by emergency services organizations (such as police, fire and emergency medical services) to prevent or respond to incidents that harm or endanger persons or property). Such base stations are also referred to here as "safety wireless service base stations" or "safety base stations." The base station 140 also can include, in addition to safety base stations, one or more base stations that are used to provide commercial cellular wireless service. Such base stations are also referred to here as "commercial wireless service base stations" or "commercial base stations."

The base station 140 can be coupled to the master unit 110 using a network of attenuators, combiners, splitters, amplifiers, filters, cross-connects, etc., (sometimes referred to collectively as a "point-of-interface" or "POI"). This network can be included in the master unit 110 and/or can be separate from the master unit 110. This is done so that, in the downlink, the desired set of RF channels output by the base station 140 can be extracted, combined, and routed to the appropriate master unit 110, and so that, in the uplink, the desired set of carriers output by the master unit 110 can be extracted, combined, and routed to the appropriate interface of each base station 140. It is to be understood, however, that this is one example and that other embodiments can be implemented in other ways.

Figure 1B:
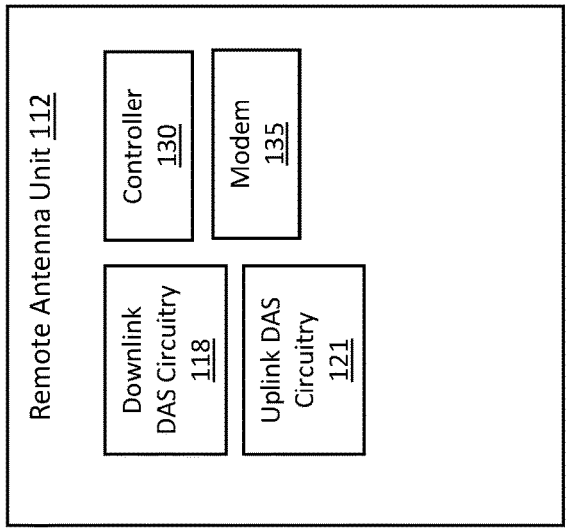
Figure 1A:
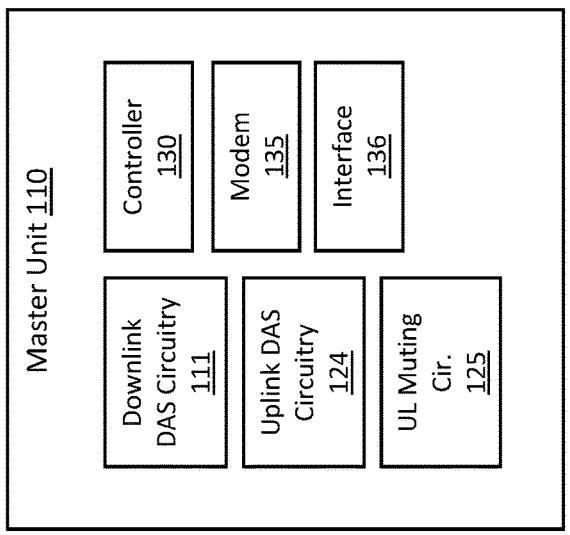

As shown in FIG. 1A, in general, master unit 110 comprises downlink DAS circuitry 111 that is configured to receive one or more downlink signals from the base stations 140. These signals are also referred to here as "base station downlink signals." Each base station downlink signal includes one or more radio frequency channels used for communicating in the downlink direction with user equipment 116 (which may include cellular phones, tablets, and other mobile user devices, for example) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The downlink DAS circuitry 111 in each master unit 110 is also configured to generate one or more downlink transport signals derived from one or more base station downlink signals and to transmit one or more downlink transport signals to one or more of the remote antenna units 112.

As shown in FIG. 1B, each remote antenna unit 112 comprises downlink DAS circuitry 118 that is configured to receive the downlink transport signals transmitted to it from the master unit 110 and to use the received downlink transport signals to generate one or more downlink radio frequency signals that are radiated from one or more antennas 119 associated with that remote antenna unit 112 for reception by user equipment 116. These downlink radio frequency signals are analog radio frequency signals and are also referred to here as "remote downlink radio frequency signals." Each remote downlink radio frequency signal includes one or more of the downlink radio frequency channels used for communicating with user equipment 116 over the wireless air interface. In this way, the DAS 100 increases the coverage area for the downlink capacity provided by the base stations 140. Also, each remote antenna unit 112 comprises uplink DAS circuitry 121 that is configured to receive via antenna 119 one or more uplink radio frequency signals transmitted from the user equipment 116. These signals are analog radio frequency signals and are also referred to here as "remote uplink radio frequency signals." Each uplink radio frequency signal includes one or more radio frequency channels used for communicating in the uplink direction with user equipment 116 over the relevant wireless air interface. The uplink DAS circuitry 121 in each remote antenna unit 112 is configured to generate one or more uplink transport signals derived from the one or more remote uplink radio frequency signals and to transmit one or more uplink transport signals to one or more of the master units 110.

Each master unit 110 comprises uplink DAS circuitry 124 that is configured to receive the respective uplink transport signals transmitted to it from one or more remote antenna units 112 and to use the received uplink transport signals to generate one or more base station uplink radio frequency signals that are provided to the one or more base stations 140 associated with that master unit 110. Typically, this involves, among other things, combining or summing uplink signals received from multiple remote antenna units 112 in order to produce the base station signal provided to each base station 140. Each base station uplink signal includes one or more of the uplink radio frequency channels used for communicating with user equipment 116 over the wireless air interface. In this way, the DAS 100 increases the coverage area for the uplink capacity provided by the base stations 140.

Figure 1C:
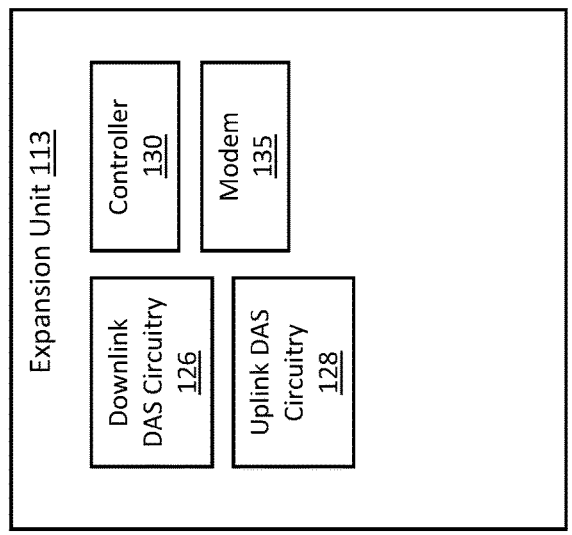

As shown in FIG. 1C, each intermediary unit 113 comprises downlink DAS circuitry 126 that is configured to receive the downlink transport signals transmitted to it from the master unit 110 (or other intermediary unit 113) and transmits the downlink transport signals to one or more remote antenna units 112 or other downstream intermediary units 113. Each intermediary unit 113 comprises uplink DAS circuitry 128 that is configured to receive the respective uplink transport signals transmitted to it from one or more remote antenna units 112 or other downstream intermediary units 113, combine or sum the received uplink transport signals, and transmit the combined uplink transport signals uplink to the master unit 110 or other intermediary unit 113. In other embodiments, one or more remote antenna units 112 are coupled to master unit 110 via one or more other remote antenna units 112 (for examples, where the remote antenna units 112 are coupled together in a daisy chain or ring topology). In such an embodiments, an intermediary unit 113 may be implemented using a remote antenna unit 112.

The downlink DAS circuitry 111, 118, and 126 and uplink DAS circuitry 124, 121, and 128 in each master unit 110, remote antenna unit 112, and intermediary unit 113, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 111, 118, and 126 and uplink DAS circuitry 124, 121, and 128 may share common circuitry and/or components. For example, some components (such as duplexers) by their nature are shared among the downlink DAS circuitry 111, 118, and 126 and uplink DAS circuitry 124, 122, and 128.

The DAS 100 can use either digital transport, analog transport, or combinations of digital and analog transport for generating and communicating the transport signals between the master units 110, the remote antenna units 112, and any intermediary units 113. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 110 and the remote antenna units 112), or combinations of analog and digital transport.

Each unit 110, 112, 113 in the DAS 100 also comprises a respective controller 130. The controller 130 is implemented using one or more programmable processors that execute software that is configured to implement the various features described here as being implemented by the controller 130. The controller 130 (the various features described here as being implemented by the controller 130) (or portions thereof) can be implemented in other ways (for example, in a field programmable gate array (FPGA), application specific integrated circuit (ASIC), etc.). Each controller 130 is configured to monitor and control the operation of the associated unit. Each controller 130 is also configured to send and receive management data over the DAS 100. In one embodiment, each unit 110, 112, 113 in the DAS 100 also comprises a modem 135 that is configured to send and receive management data over the DAS 100 by modulating and demodulating one or more carrier frequencies that are used for the purpose of communicating management data. In some embodiments (for example, where digital transport is used in the DAS), a separate modem 135 for modulating and demodulating management data is not used and, instead, the management data is combined with the digital DAS transport data before being supplied to the transport transceiver or other physical layer device.

Figure 2:
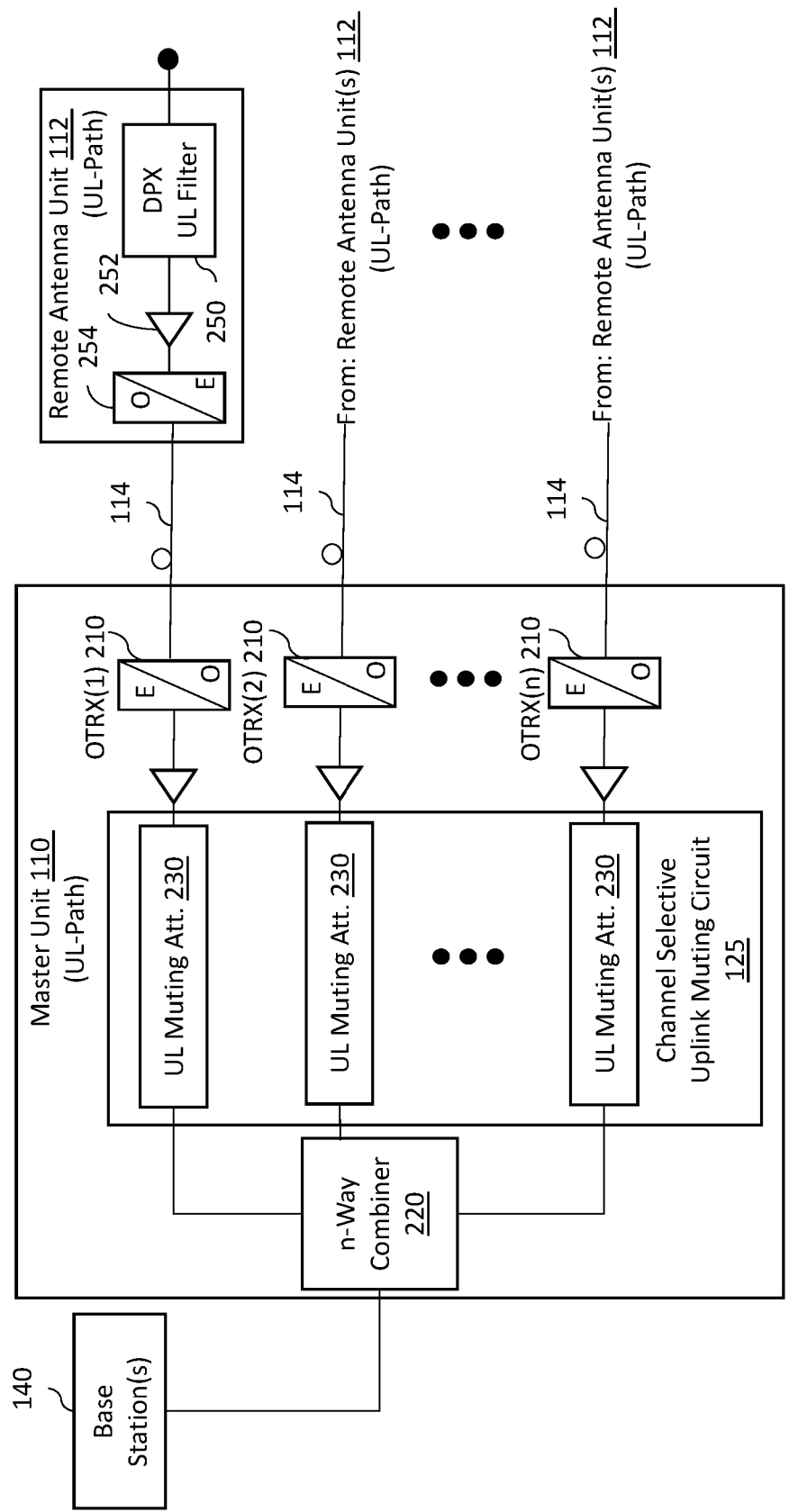
FIG. 2 is a block diagram illustrating an example master unit embodiment.

FIG. 2 is a simplified block diagram illustrating an uplink (UL) path for a master unit 110 of one embodiment of the present disclosure which may be used to implement the OMU of the DAS 100 described in FIG. 1. As shown in FIG. 2, the UL path for master unit 110 is configured to receive uplink transport signals from a plurality of remote antenna units 112 as optical uplink transport signals. The master unit 110 comprises, among other elements, an RF combiner 220 and a plurality of optical interfaces (OTRX) 210 which convert electrical signals to optical signals in the downlink (DL) direction, and optical signals to electrical signals in the uplink (UL) direction. Each of the remote antenna units 112 communicates its uplink transport signals via cable 114 to an OTRX 210 which converts the optical uplink transport signals to electrical uplink transport signals. The plurality of electrical uplink transport signals are processed by the master unit 110 and combined by a combiner 220 to form the base station uplink radio frequency signals that are provided to the base station 140. Downlink RF signals received from the base station 140 are processed by a downlink (DL) path of the master unit 110 as discussed above, where they may be split (e.g., by a splitter) and distributed to the plurality of OTRX 210, which convert the downlink RF signals into optical downlink transport signals to be distributed over cables 114 to the Rus 112. In some embodiments, the cables 114 may operate as a bidirectional transport medium where a common cable 114 coupled to the OTRX 210 may carry uplink and downlink transport signals between the master unit 110 and any particular remote antenna unit 112. In other embodiments, each cable 114 may comprise a pair, or set, of optical cables where one carries uplink transport signals from a remote antenna unit 112 and the other carries downlink transport signals to the remote antenna unit. In that case, both the uplink and downlink carrying cables for a remote antenna unit are coupled to the OTRX 210.

Uplink signals from a remote antenna unit 112, in addition to carrying the desired uplink transport signals, will carry noise generated within the remote antenna unit 112 including noise generated by its uplink filters 250, low noise amplifier 252, and OTRX 254 (which is used to generate and launch onto a cable 114 the optical uplink transport signals for communication with the OTRX 210). In one embodiment, the channel selective uplink muting circuit 125 operates to selectively mute those channels of the uplink transport signals that are not presently carrying uplink communications traffic so that the noise appearing on that channel is suppressed and not propagated further uplink. In other words, when a channel within the uplink transport signals from a remote antenna unit 112 is carrying uplink communications traffic, that channel will carry both the uplink communications traffic and the undesired noise component. When a channel within the uplink transport signals for the remote antenna unit 112 is not carrying uplink communications traffic, that channel will still carry the undesired noise component even though no uplink communications traffic is present. If not addressed as described herein, the combiner 220 will sum any noise received from that remote antenna unit 112 with the uplink communications traffic and undesired noise components received from the other remote antenna units 112, which decreases the overall signal-to-noise ratio of the base station uplink signal and may lead to uplink receiver desensitization at the base station 140.

The channel selective uplink muting circuit 125 operates on each of the individual uplink transport signals by selectively muting channels in those signals during those times where the uplink transport signals is not carrying uplink communications traffic on those channels. For example, in one embodiment, a time division multiplexing (TDM) scheme may be used that divides the uplink transport signals into timeslots where each timeslot defines a distinct uplink channel. If uplink transport signals are being actively received in timeslots 1, 2 and 4, but not in timeslot 3, then the selective uplink muting circuit 125 will mute timeslot 3. By muting the channel within the master unit 110 after the OTRX 210 performs the optical-electrical signal conversion, the channel selective uplink muting circuit 125 is able to suppress both the noise generated on that channel from within the remote antenna unit 112, but also noise generated by the optical-electrical signal conversion. As such, the uplink transport signals received at the combiner 220 may comprise noise from channels associated with active uplink communications traffic, but not noise from channels not currently carrying active uplink communications traffic.

In one embodiment, the selective uplink muting circuit 125 comprises a plurality of uplink muting attenuators 230, each coupled to an OTRX 210 and configured to receive the electrical uplink transport signals output from the OTRX 210. It should be understood that the selective uplink muting circuit 125 illustrated in FIG. 2 is intended as a general schematic and that the uplink muting attenuators 230 may be implemented using either analog or digital components and circuitry, or a combination of both.

In one embodiment, the master unit's controller 130, the selective uplink muting circuit 125, or other function of the master unit 110, monitors the electrical uplink transport signals from a remote antenna unit 112 to identify channels within the uplink transport signals that are not carrying uplink communications traffic. Those identified channels are selected for muting by the selective uplink muting circuit 125. The uplink muting attenuator 230 associate with that remote antenna unit 112 responds by attenuating within the uplink transport signal the channel selected for muting. The output from each of the individual uplink muting attenuators 230 is passed to the combiner 220 and sent to the base station 140 as described above.

Figure 2A:
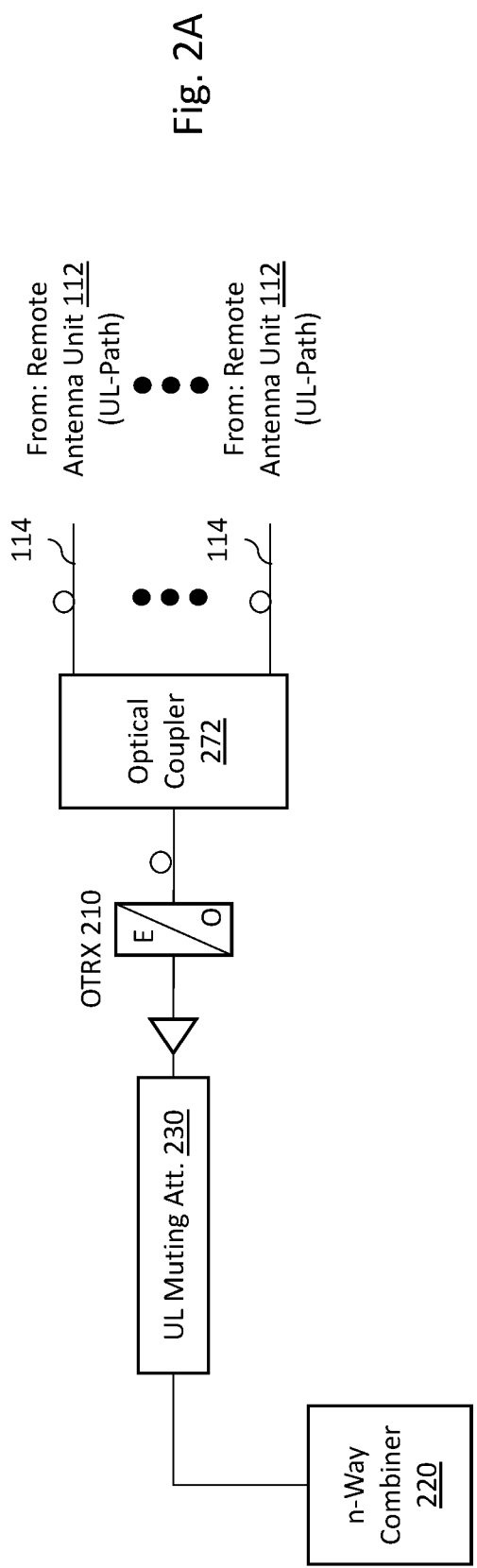
FIGS. 2A and 2B are diagrams illustrating alternate configurations for an example master unit embodiment.
Figure 2B:
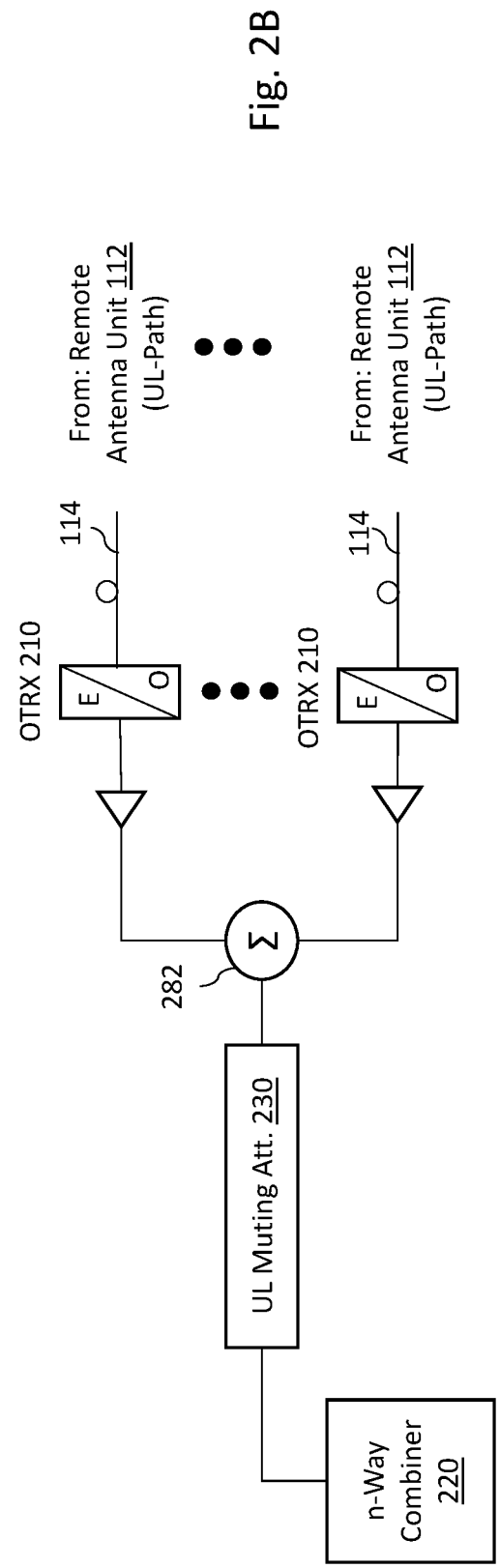

Even though the most improvement in uplink signal noise suppression is typically reached when there is a one-to-one correspondence between a remote unit 112 and an uplink muting attenuator 230 (as illustrated in FIG. 2) in other embodiments, the master unit 110 may be optionally structured so that an uplink muting attenuator 230 is connected to multiple remote units 110. FIGS. 2A and 2B illustrate two examples where uplink paths for a master unit 110 are so configured. FIG. 2A illustrates a "cascade architecture" where multiple remote antenna units 112 are coupled to an OTRX 210 via an optical coupler 272 so that the single uplink muting attenuator 230 handles uplink signal noise suppression for that set of remote antenna units 112. FIG. 2B illustrates another alternative where instead, each remote unit 110 is coupled to a respective OTRX 210. The resulting upstream electrical signals from the OTRXs 210 are combined by an adder 282 and sent to a single uplink muting attenuator 230 which handles uplink signal noise suppression for that set of remote antenna units 112. Although such alternate configurations may not provide the same level of uplink signal noise suppression, they may be acceptable for applications where additional costs savings justify reduced uplink muting performance and/or higher desensitization of the base station.

It should be noted that the degree of uplink signal noise suppression provided by the uplink muting attenuators 230 directly affects the number of remote antenna units 112 that the DAS 100 may comprise without incurring desensitization at the base station 140. For example, if each uplink muting attenuator 230 is configured to apply 3 dB of attenuation, the noise contribution from unused uplink channels would be cut by one-half. Thus, in some such implementations, the number of remote antenna units 112 that the DAS 100 may support could increase approximately two-fold. A greater degree of attenuation 120 would yield an even greater ability to include more remote antenna units 112 (and thus allow a single base station to provide public safety coverage to a larger geographic area). As such, the designer of a DAS may determine the amount of attenuation that uplink muting attenuators 230 should be configured to apply based at least in part on the number of remote antenna units 112 the DAS designer wishes to incorporate into the DAS. Alternatively, instead of configuring the attenuation of the uplink muting attenuators 230 for the purpose of increasing the number of remote antenna units 112, the designer of the DAS may instead take advantage of the reduction in uplink noise to provide increased sensitivity for the base station 140 and this provide better uplink performance for the whole system. By locating the selective uplink muting circuit 125 in a centralized location in the master unit, maintenance, repair and/or reconfiguration of the selective uplink muting circuit 125 may also be more efficiently completed. Moreover, an existing DAS may be retrofitted to incorporate this functionality at the master unit without the need to travel to each remote antenna unit. In some embodiments, the attenuation applied by the channel selective uplink muting circuit to the uplink transport signals that are not carrying uplink communications traffic may be either locally or remotely configurable.

Figure 3:
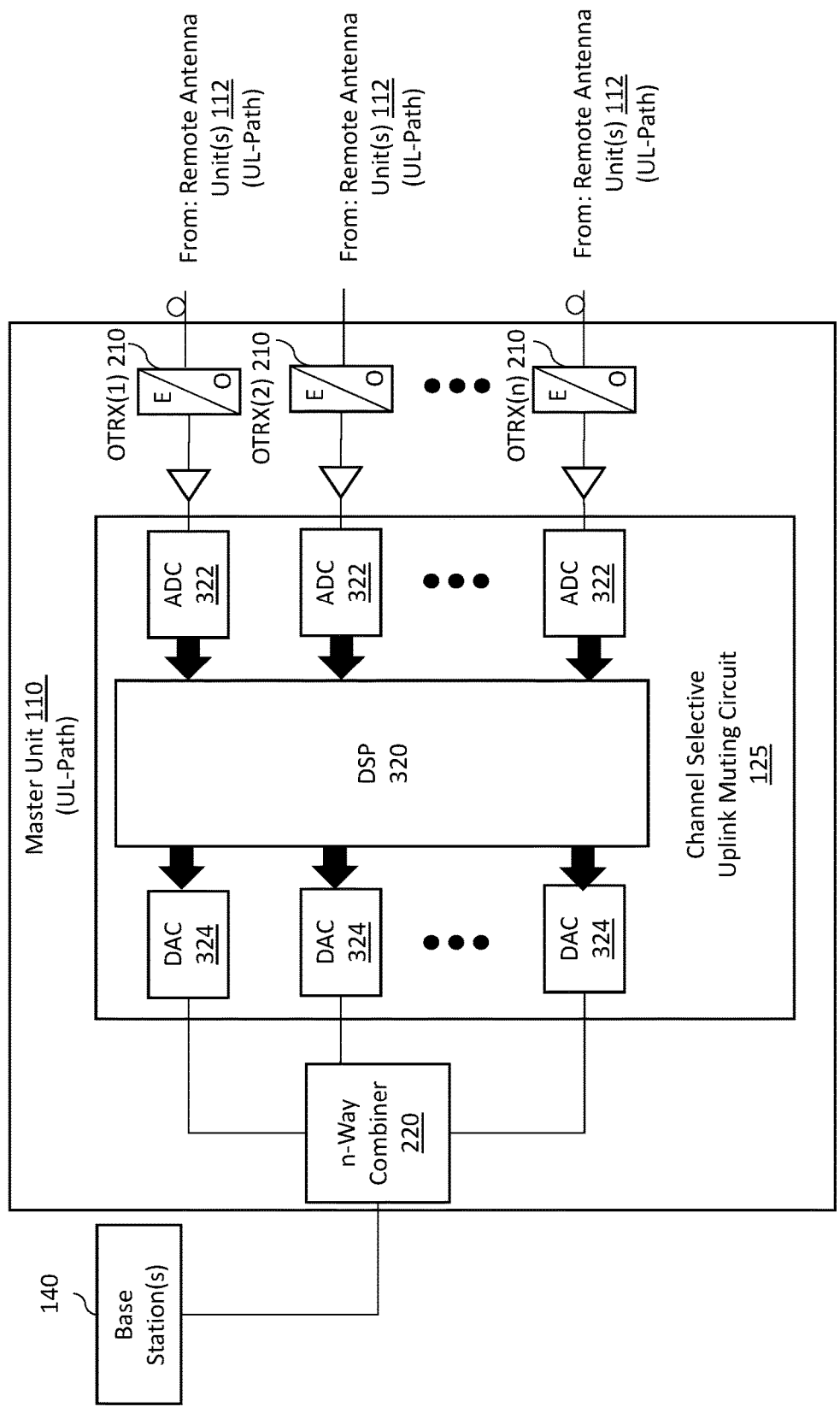
FIG. 3 is a block diagram illustrating an example master unit embodiment.

FIG. 3 is a simplified diagram illustrating example embodiment of an uplink (UL) path for a master unit 110 that digitally implements the selective uplink muting circuit 125. In this embodiment, the selective uplink muting circuit 125 functions as described with respect to FIGS. 1, 2, 2A and 2B, but is implemented by a digital signal processor 320, a plurality of analog-to-digital converters (ADCs) 322, and a plurality of digital-to-analog converters (DACs) 324. In this example embodiment, each of the plurality of analog-to-digital converters (ADCs) 322 are coupled to an OTRX 210 and configured to receive the electrical uplink transport signals output from the OTRX 210 and convert them into a data stream of digitized data. For each remote antenna unit 112 coupled to the master unit 110, the digital signal processor 320 receives a data stream of digitized data that represents both the uplink communications traffic and uplink noise from at least one remote antenna unit 112. Because a digital signal processor can handle several data streams in parallel, it can digitally implement the function of the uplink muting attenuators 230 for multiple remote antenna units 112 at the same time. As such, there is no need for a digital signal processor unit for each individual remote antenna unit 112 which is a substantial cost savings factor for implementing selective uplink muting in the DAS 100. In this embodiment, the digital signal processor 320 or other component of the master unit 110, monitors the data stream of digitized data from each remote antenna unit 112 to identify channels across each of the individual remote antenna units 112 that are not carrying uplink communications traffic. Those identified channels are selected for muting by the selective uplink muting circuit 125, which may be performed digitally by the digital signal processor 320 applying one or more filters to the suppress noise the data streams in those selected channels (e.g. timeslots and/or frequencies). In one embodiment, each of the filtered data streams associated with each of the individual remote antenna units 112 is output from the digital signal processor 320 to a respective digital-to-analog converters (DACs) 324 that converts the data stream back to analog signals that are combined by the combiner 242 to produce the base station uplink radio frequency signal that is transmitted to the base station 140.

Figure 4:
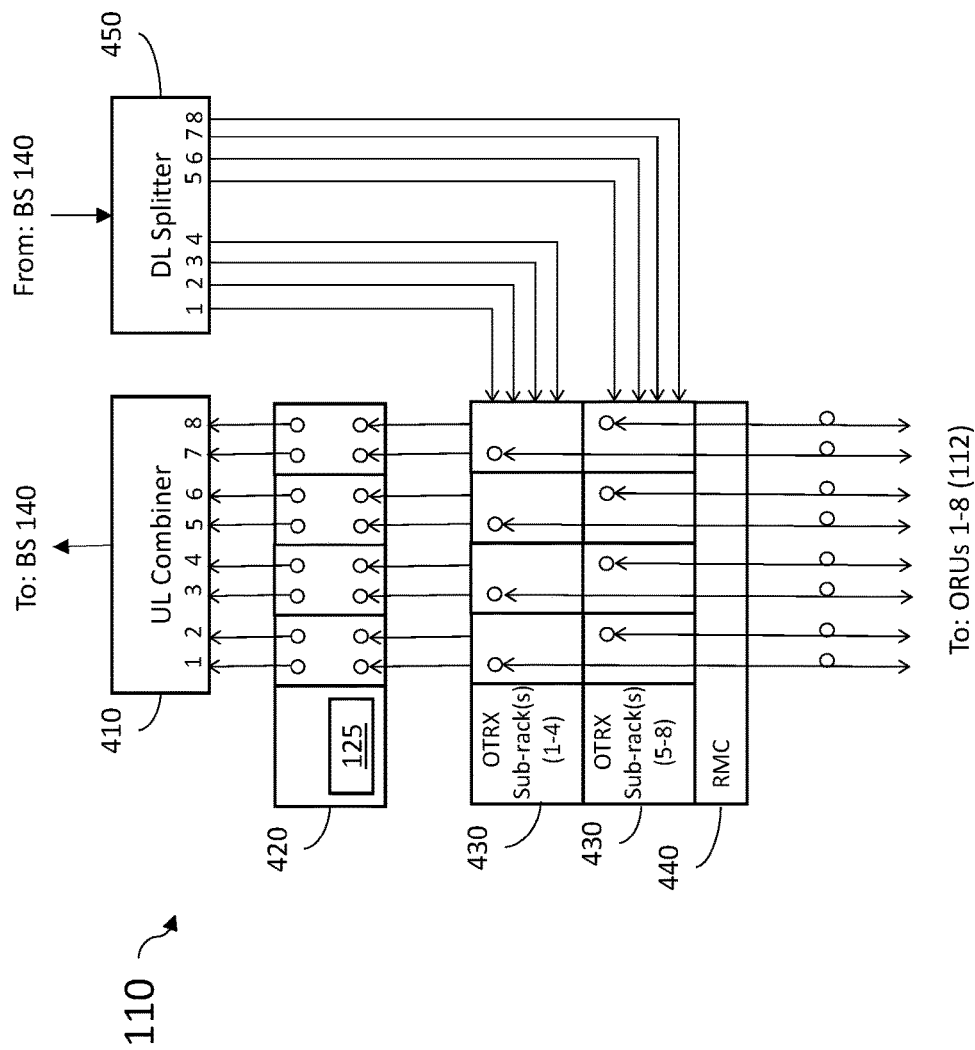
FIG. 4 is a block diagram illustrating an example master unit embodiment.

FIG. 4 is a block diagram illustrating an example of a master unit 110 implemented as cabinet/rack mounted optical master unit. In the downlink path, the master unit 110 includes a downlink RF splitter 450 that receives the base station downlink signal from base station 140 and splits the base station downlink signal for input into a one or more optical transceiver sub-racks (shown at 430). Each of the plurality of optical transceiver sub-racks 430 comprises a plurality of optical transceivers (such as OTRX 214), each configured to optically communicate with an associated optical remote unit (ORU) via fiber optic cables. In the particular embodiment shown in FIG. 4, each optical transceiver sub-rack 430 is configured to communicate with, and process uplink and downlink transport signals, for four optical remote units. As such, to accommodate optical communication with eight optical remote units, two optical transceiver sub-racks 430 would be used. It should be appreciated that in other embodiments, the actual number of optical remote units supported by an optical transceiver sub-rack 430 could be fewer or greater than four. In the downlink direction, the optical transceiver sub-racks 430 convert the downlinks signals received from the downlink RF splitter 450 into optical downlink transport signals to the optical remote units 112. In the uplink direction, each optical transceiver sub-rack 430 is configured to receive optical uplink transport signals from the optical remote units 112 and convert the optical uplink transport signals to electrical uplink transport signals, which are output from the optical transceiver sub-racks 430 to a signal-processing sub-rack 420. In one embodiment, the signal-processing sub-rack 420 comprises a selective uplink muting circuit 125 (such as illustrated in either FIG. 2 or FIG. 3) for example. The electrical uplink transport signals received at the signal-processing sub-rack 420 from the optical transceiver sub-racks 430 are input into the selective uplink muting circuit 125 and monitored by the signal-processing sub-rack 420 to distinguish uplink communications channels actively transporting communications traffic from those not actively transporting communications traffic. Uplink communications channels identified as not actively transporting communications traffic are selected for muting, which may be implemented using analog or digital techniques as discussed above. Resulting signals associated with each optical remote unit 112 are output from the selective uplink muting circuit 125 and combined by the uplink RF combiner 410 to output an uplink base station signal to the base station 140. In some embodiments, the master unit 110 shown in FIG. 4 may further comprise a rack master controller 440 which may be remotely accessed to reconfigure and/or obtain the status of components of the master unit 110 including, but not limited to the selective uplink muting circuit 125. For example, in some embodiments, the rack master controller 440 may be remotely accessed to reconfigure the attenuation applied by the selective uplink muting circuit 125 on a channel-by-channel basis and/or selectively enable or disable selective uplink muting on a channel-by-channel basis, or on a remote unit basis.

Figure 5:
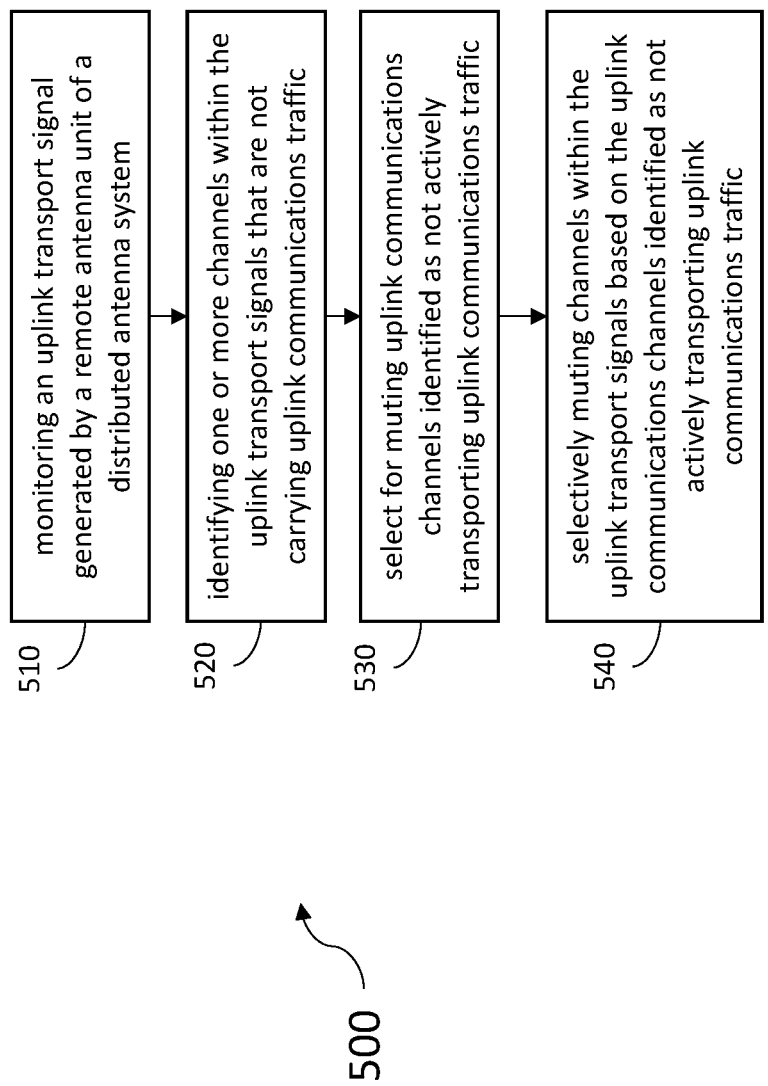
FIG. 5 is a flow chart illustrating an example method embodiment.

FIG. 5 is a flow chart illustrating generally at 500 an example method embodiments for uplink noise suppression for a distributed antenna system. It should be understood that the features and elements described herein with respect to the method 500 shown in FIG. 5 and the accompanying description may be used in conjunction with, in combination with, or substituted for elements of any of the other embodiments discussed with respect to FIGS. 1-4, or elsewhere herein, and vice versa. Further, it should be understood that the functions, structures and other description of elements associated with embodiments of Figure may apply to like named or described elements for any of the other figures and embodiments and vice versa.

The method begins at 510 with monitoring an uplink transport signal generated by a remote antenna unit of a distributed antenna system. The uplink transport signal may carry one or more channels of uplink communications traffic generated by the remote antenna unit from uplink wireless RF signals from one or more units of user equipment within the coverage area of the remote antenna unit. In some embodiments, the monitoring may be performed at a master unit of the distributed antenna system that is coupled to the remote antenna unit and one or more additional remote antenna units. The uplink transport signal may also include uplink noise as discussed above. The method proceeds to 520 with identifying one or more channels within the uplink transport signals that are not carrying uplink communications traffic, and to 530 where uplink communications channels identified as not actively transporting uplink communications traffic are selected for muting. The method proceeds to 540 with selectively muting channels within the uplink transport signals based on the uplink communications channels identified as not actively transporting uplink communications traffic. Those channels that are conversely identified as actively transporting uplink communications traffic are communicated uplink as a base station uplink signal to a base station in communication with the DAS. In one embodiment, method further includes combining uplink communications channels identified as actively transporting uplink communications traffic from a first remote antenna unit with uplink communications channels identified as actively transporting uplink communications traffic from at least one other remote antenna unit, and communicating the combined signal as a base station uplink signal to the base station.

Example Embodiments

Example 1 includes a distributed antenna system, the system comprising: a master unit configured to receive a base station downlink radio frequency signal and to transmit a base station uplink radio frequency signal; and a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna; wherein the master unit comprises a channel selective uplink muting circuit; wherein the master unit receives and monitors uplink transport signals from the remote uplink radio frequency signal to identify one or more channels within the uplink transport signals that are not carrying uplink communications traffic; wherein the channel selective uplink muting circuit selectively mutes channels of the uplink transport signals that are not carrying uplink communications traffic.

Example 2 includes the system example 1, wherein the channel selective uplink muting circuit comprises one or more uplink muting attenuators, where each of the one or more uplink muting attenuators is coupled to at least one remote antenna unit of the plurality of remote antenna units by an optical communications link.

Example 3 includes the system of any of examples 1-2, wherein the master unit further comprises a combiner configured to combine electrical uplink transport signal outputs from the channel selective uplink muting circuit to produce the base station uplink radio frequency signals.

Example 4 includes the system of any of examples 1-3, wherein the at least one cable coupling each of the plurality of remote antenna units comprises an optical fiber.

Example 5 includes the system of any of examples 1-4, wherein an attenuation applied by the channel selective uplink muting circuit to the uplink transport signals that are not carrying uplink communications traffic is either locally or remotely configurable.

Example 6 includes the system of any of examples 1-5, wherein the at least one cable coupling each of the plurality of remote antenna units comprises an uplink optical fiber and a downlink optical fiber.

Example 7 includes the system of any of examples 1-6, wherein the selective uplink muting circuit comprises: a digital signal processor; a plurality of analog-to-digital converters; and a plurality of digital-to-analog converters; wherein each of the plurality of analog-to-digital converters are coupled to an optical transceiver and configured to receive the electrical uplink transport signals as output from the optical transceiver for conversion to a digitized data stream, wherein the digitized data stream represents any present uplink communications traffic and uplink noise from at least one remote antenna unit; wherein the one or more channels within the uplink transport signals that are identified as not carrying uplink communications traffic are digitally muted by the digital signal processor; wherein filtered data streams associated with each of the plurality of remote antenna units is output from the digital signal processor to a respective one of the plurality of digital-to-analog converters that are configured to convert the filtered data streams to analog signals.

Example 8 includes the system of any of examples 1-7, wherein the channel selective uplink muting circuit does not mute channels of the uplink transport signals that are identified as carrying uplink communications traffic.

Example 9 includes a master unit for a distributed antenna system comprising a plurality of remote antenna units, the master unit comprising: a plurality of electro-optical transceivers each configured to couple to at least one of the plurality of remote antenna units via an optical fiber cable, wherein each of the plurality of electro-optical transceivers are configured to receive optical uplink transport signals via the optical fiber cable and convert the optical uplink transport signals to an electrical optical transport signals; a channel selective uplink muting circuit coupled to the plurality of electro-optical transceivers to receive the electrical optical transport signals, wherein the channel selective uplink muting circuit selectively mutes channels within the uplink transport signals that are not carrying uplink communications traffic; a combiner configured to combine electrical uplink transport signal outputs from the channel selective uplink muting circuit to produce base station uplink radio frequency signals.

Example 10 includes the master unit of example 9, wherein the channel selective uplink muting circuit comprises one or more uplink muting attenuators, where each of the one or more uplink muting attenuators receives the electrical optical transport signals from one of the electro-optical transceivers.

Example 11 includes the master unit of any of examples 9-10, wherein the optical fiber cable comprises at least a downlink optical fiber and an uplink optical fiber.

Example 12 includes the master unit of any of examples 9-11, wherein the optical fiber cable comprises at least bidirectional optical fiber carrying uplink transport signals and downlink transport signals.

Example 13 includes the master unit of any of examples 9-12, wherein an attenuation applied by the channel selective uplink muting circuit to the uplink transport signals that are not carrying uplink communications traffic is either locally or remotely configurable.

Example 14 includes the master unit of any of examples 9-13, wherein the selective uplink muting circuit comprises: a digital signal processor; a plurality of analog-to-digital converters; and a plurality of digital-to-analog converters; wherein each of the plurality of analog-to-digital converters are coupled to a respective one of the plurality of electro-optical transceivers and configured to receive an associated electrical uplink transport signals for conversion to a digitized data stream, wherein the digitized data stream represents any present uplink communications traffic and uplink noise from at least one remote antenna unit; wherein the one or more channels within the uplink transport signals that are identified as not carrying uplink communications traffic are digitally muted by the digital signal processor; wherein filtered data streams associated with each of the plurality of remote antenna units is output from the digital signal processor to a respective one of the plurality of digital-to-analog converters that are configured to convert the filtered data streams to analog signals.

Example 15 includes the master unit of any of examples 9-14, wherein the channel selective uplink muting circuit selectively does not mute channels of the uplink transport signals that are identified as carrying uplink communications traffic.

Example 16 includes a method for uplink noise suppression in a distributed antenna system, the method comprising: monitoring uplink transport signals generated by a remote antenna unit of a distributed antenna system; identifying one or more channels within the uplink transport signals that are not carrying uplink communications traffic; selecting for muting uplink communications channels identified as not actively transporting uplink communications traffic; and selectively muting channels within the uplink transport signals based on the uplink communications channels identified as not actively transporting uplink communications traffic.

Example 17 includes the method of example 16, further comprising converting the uplink transport signal from an optical uplink transport signal to an electrical uplink signal prior to selectively muting channels within the uplink transport signals.

Example 18 includes the method of any of examples 16-17, further comprising combining uplink transport signals from the remote antenna unit with uplink transport signals from another remote antenna unit after selectively muting channels within the uplink transport signals.

Example 19 includes the method of any of examples 16-18, further comprising: processing with a digital signal processor uplink transport signals from a first remote antenna unit while processing with the digital signal processor uplink transport signals from a second remote antenna unit to selectively mute channels within the uplink transport signals from the first remote antenna unit and selectively mute channels within the uplink transport signals from the second remote antenna unit.

Example 20 includes the method of any of examples 16-19, further comprising: processing with a first uplink muting attenuator uplink transport signals from a first remote antenna unit in parallel with processing with a second uplink muting attenuator uplink transport signals from a second remote antenna unit to selectively mute channels within the uplink transport signals from the first remote antenna unit and selectively mute channels within the uplink transport signals from the second remote antenna unit.

In various alternative embodiments, system and/or device elements, method steps, or example implementations described throughout this disclosure (such as any of the master units, remote antenna units, controllers, circuits, attenuators, processors, base stations, transceivers, or subparts thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, DAS related terms such as "master unit", "remote unit", "remote antenna unit", "attenuator", "circuit", "circuitry", "combiner", "adder", "coupler", "splitter", "digital to analog converter", "analog to digital converter", "digital signal processor" and "controller" refer to hardware elements that would be recognized and understood by those of skill in the art of wireless communications and are not used herein as generic placeholders, nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A distributed antenna system, the system comprising:
a master unit configured to receive a base station downlink radio frequency signal and to transmit a base station uplink radio frequency signal; and
a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna;
wherein the master unit comprises a channel selective uplink muting circuit;
wherein the master unit receives and monitors uplink transport signals from the remote uplink radio frequency signal to identify one or more channels within the uplink transport signals that are not carrying uplink communications traffic; and
wherein the channel selective uplink muting circuit selectively mutes channels of the uplink transport signals that are not carrying uplink communications traffic;
wherein the selective uplink muting circuit comprises:
a digital signal processor;
a plurality of analog-to-digital converters; and
a plurality of digital-to-analog converters;
wherein each of the plurality of analog-to-digital converters are coupled to an optical transceiver and configured to receive the electrical uplink transport signals as output from the optical transceiver for conversion to a digitized data stream, wherein the digitized data stream represents any present uplink communications traffic and uplink noise from at least one remote antenna unit;
wherein the one or more channels within the uplink transport signals that are identified as not carrying uplink communications traffic are digitally muted by the digital signal processor; and
wherein filtered data streams associated with each of the plurality of remote antenna units is output from the digital signal processor to a respective one of the plurality of digital-to-analog converters that are configured to convert the filtered data streams to analog signals.

2. The system of claim 1, wherein the channel selective uplink muting circuit comprises one or more uplink muting attenuators, where each of the one or more uplink muting attenuators is coupled to at least one remote antenna unit of the plurality of remote antenna units by an optical communications link.

3. The system of claim 1, wherein the master unit further comprises a combiner configured to combine electrical uplink transport signal outputs from the channel selective uplink muting circuit to produce the base station uplink radio frequency signals.

4. The system of claim 1, wherein the at least one cable coupling each of the plurality of remote antenna units comprises an optical fiber.

5. The system of claim 1, wherein an attenuation applied by the channel selective uplink muting circuit to the uplink transport signals that are not carrying uplink communications traffic is either locally or remotely configurable.

6. The system of claim 1, wherein the at least one cable coupling each of the plurality of remote antenna units comprises an uplink optical fiber and a downlink optical fiber.

7. The system of claim 1, wherein the channel selective uplink muting circuit does not mute channels of the uplink transport signals that are identified as carrying uplink communications traffic.

8. A master unit for a distributed antenna system comprising a plurality of remote antenna units, the master unit comprising:
- a plurality of electro-optical transceivers each configured to couple to at least one of the plurality of remote antenna units via an optical fiber cable, wherein each of the plurality of electro-optical transceivers are configured to receive optical uplink transport signals via the optical fiber cable and convert the optical uplink transport signals to an electrical optical transport signals;
- a channel selective uplink muting circuit coupled to the plurality of electro-optical transceivers to receive the electrical optical transport signals, wherein the channel selective uplink muting circuit selectively mutes channels within the uplink transport signals that are not carrying uplink communications traffic; and
- a combiner configured to combine electrical uplink transport signal outputs from the channel selective uplink muting circuit to produce base station uplink radio frequency signals;
- wherein the selective uplink muting circuit comprises:
  - a digital signal processor;
  - a plurality of analog-to-digital converters; and
  - a plurality of digital-to-analog converters;
  - wherein each of the plurality of analog-to-digital converters are coupled to a respective one of the plurality of electro-optical transceivers and configured to receive an associated electrical uplink transport signals for conversion to a digitized data stream, wherein the digitized data stream represents any present uplink communications traffic and uplink noise from at least one remote antenna unit;
  - wherein the one or more channels within the uplink transport signals that are identified as not carrying uplink communications traffic are digitally muted by the digital signal processor; and
  - wherein filtered data streams associated with each of the plurality of remote antenna units is output from the digital signal processor to a respective one of the plurality of digital-to-analog converters that are configured to convert the filtered data streams to analog signals.

9. The master unit of claim 8, wherein the channel selective uplink muting circuit comprises one or more uplink muting attenuators, where each of the one or more uplink muting attenuators receives the electrical optical transport signals from one of the electro-optical transceivers.

10. The master unit of claim 8, wherein the optical fiber cable comprises at least a downlink optical fiber and an uplink optical fiber.

11. The master unit of claim 8, wherein the optical fiber cable comprises at least bidirectional optical fiber carrying uplink transport signals and downlink transport signals.

12. The master unit of claim 8, wherein an attenuation applied by the channel selective uplink muting circuit to the uplink transport signals that are not carrying uplink communications traffic is either locally or remotely configurable.

13. The master unit of claim 8, wherein the channel selective uplink muting circuit selectively does not mute channels of the uplink transport signals that are identified as carrying uplink communications traffic.

14. A method for uplink noise suppression in a distributed antenna system, the method comprising:
- monitoring, with a selective uplink muting circuit, uplink transport signals generated by a remote antenna unit of a distributed antenna system;
- identifying, with the selective uplink muting circuit, one or more channels within the uplink transport signals that are not carrying uplink communications traffic;
- selecting for muting, with the selective uplink muting circuit, uplink communications channels identified as not actively transporting uplink communications traffic; and
- selectively muting channels within the uplink transport signals, with the selective uplink muting circuit, based on the uplink communications channels identified as not actively transporting uplink communications traffic;
- wherein the selective uplink muting circuit comprises:
  - a digital signal processor;
  - a plurality of analog-to-digital converters; and
  - a plurality of digital-to-analog converters;
  - wherein each of the plurality of analog-to-digital converters are coupled to a respective one of the plurality of electro-optical transceivers and configured to receive an associated electrical uplink transport signals for conversion to a digitized data stream, wherein the digitized data stream represents any present uplink communications traffic and uplink noise from at least one remote antenna unit;
  - wherein the one or more channels within the uplink transport signals that are identified as not carrying uplink communications traffic are digitally muted by the digital signal processor; and
  - wherein filtered data streams associated with each of the plurality of remote antenna units is output from the digital signal processor to a respective one of the plurality of digital-to-analog converters that are configured to convert the filtered data streams to analog signals.

15. The method of claim 14, further comprising converting the uplink transport signal from an optical uplink transport signal to an electrical uplink signal prior to selectively muting channels within the uplink transport signals.

16. The method of claim 14, further comprising combining uplink transport signals from the remote antenna unit with uplink transport signals from another remote antenna unit after selectively muting channels within the uplink transport signals.

17. The method of claim 14, further comprising:
processing with a digital signal processor uplink transport signals from a first remote antenna unit while processing with the digital signal processor uplink transport signals from a second remote antenna unit to selectively mute channels within the uplink transport signals from the first remote antenna unit and selectively mute channels within the uplink transport signals from the second remote antenna unit.

18. The method of claim 14, further comprising:
processing with a first uplink muting attenuator uplink transport signals from a first remote antenna unit in parallel with processing with a second uplink muting attenuator uplink transport signals from a second remote antenna unit to selectively mute channels within the uplink transport signals from the first remote antenna unit and selectively mute channels within the uplink transport signals from the second remote antenna unit.

* * * * *